(12) United States Patent
Yamamoto et al.

(10) Patent No.: US 12,725,294 B2
(45) Date of Patent: Sep. 1, 2026

(54) INFORMATION PROCESSING DEVICE

(71) Applicant: TOYOTA JIDOSHA KABUSHIKI KAISHA, Toyota (JP)

(72) Inventors: Shusuke Yamamoto, Tokyo (JP); Chikara Okazaki, Gotemba (JP); Kohta Watatsu, Nagoya (JP); Hideyuki Tanaka, Nisshin (JP); Shinya Murase, Nagoya (JP); Yuki Tatsumoto, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 300 days.

(21) Appl. No.: 18/382,361

(22) Filed: Oct. 20, 2023

(65) Prior Publication Data

US 2024/0144521 A1 May 2, 2024

(30) Foreign Application Priority Data

Nov. 2, 2022 (JP) ................................. 2022-176679

(51) Int. Cl.

*G06T 7/73* (2017.01)
*G01C 21/36* (2006.01)
*G06V 20/13* (2022.01)
*G06V 40/10* (2022.01)

(52) U.S. Cl.

CPC ............ *G06T 7/73* (2017.01); *G01C 21/3691* (2013.01); *G06V 20/13* (2022.01); *G06V 40/10* (2022.01); *G06T 2207/10032* (2013.01); *G06T 2207/30196* (2013.01); *G06T 2207/30242* (2013.01)

(58) Field of Classification Search

CPC ............. G06T 7/73; G06T 2207/10032; G06T 2207/30196; G06T 2207/30242; G01C 21/3691; G01C 21/3461; G01C 21/34; G01C 21/3469; G01C 21/3647; G01C 21/3438; G06V 20/13; G06V 40/10; G06V 20/52; G06Q 10/025; G06Q 10/06315; G06Q 30/0261; G06Q 50/10; G06Q 30/0266; G06Q 10/20; H04N 7/18

USPC .......................................................... 382/103

See application file for complete search history.

(56) References Cited

U.S. PATENT DOCUMENTS

| | | | | |
|---|---|---|---|---|
| 2013/0013204 | A1 | 1/2013 | Kazama et al. | |
| 2013/0161814 | A1* | 6/2013 | McCarson | |
| 2021/0140777 | A1* | 5/2021 | Balva | G01C 21/3461 |
| 2022/0230133 | A1 | 7/2022 | Sugie et al. | |
| 2023/0351285 | A1* | 11/2023 | Tanaka et al. | G06Q 10/06315 |
| 2023/0410644 | A1 | 12/2023 | Hayashi et al. | |

(Continued)

FOREIGN PATENT DOCUMENTS

| | | | |
|---|---|---|---|
| JP | 2013-019683 | A | 1/2013 |
| JP | 2013-096704 | A | 5/2013 |

(Continued)

*Primary Examiner* — Matthew C Bella
*Assistant Examiner* — Daniel Joseph Santos
(74) *Attorney, Agent, or Firm* — Oliff PLC

(57) ABSTRACT

An information processing device is provided, which includes a memory; and a processor coupled to the memory and configured to: acquire a satellite image of the ground photographed by an artificial satellite; and provide, to a user, point information indicating points at which a number of persons present on the ground is equal to or greater than a first predetermined number, the points being identified based on the acquired satellite image.

2 Claims, 4 Drawing Sheets

(56) References Cited

U.S. PATENT DOCUMENTS

| | | | | |
|---|---|---|---|---|
| 2024/0046143 | A1* | 2/2024 | Kubendran et al. | G06N 20/00 |
| 2025/0200108 | A1* | 6/2025 | McCarson | G06F 16/587 |

FOREIGN PATENT DOCUMENTS

| | | | |
|---|---|---|---|
| JP | 2022-111643 | A | 8/2022 |
| WO | 2010/123075 | A1 | 10/2010 |
| WO | 2022/107193 | A1 | 5/2022 |

* cited by examiner

FIG.2

INFORMATION PROCESSING DEVICE

CROSS-REFERENCE TO RELATED APPLICATION

This application is based on and claims priority under 35 USC 119 from Japanese Patent Application No. 2022-176679 filed on Nov. 2, 2022, the disclosure of which is incorporated by reference herein.

BACKGROUND

Technical Field

The present disclosure relates to an information processing device.

Related Art

International Publication (WO) No. 2010/123075 discloses technology for aggregating position information of mobile terminals for each of meshes (for each of areas) segmented into rectangular mesh shapes in map data to thereby predict demand for a taxi for each area.

However, in the technology of International Publication (WO) No. 2010/123075, users who do not possess portable terminals cannot be aggregated, and therefore, there is room for improvement with regard to accurately predicting demand for each area.

SUMMARY

Accordingly, the present disclosure provides an information processing device capable of providing information indicating points at which demand is expected to be high, by viewing persons present on the ground from a bird's-eye view.

An information processing device according to a first aspect of the present disclosure includes: an acquisition section that acquires a satellite image of the ground photographed by an artificial satellite; and a provision section that provides, to a user, point information indicating points at which a number of persons present on the ground is equal to or greater than a first predetermined number, the points being identified based on the satellite image acquired by the acquisition section.

In the information processing device according to the first aspect, the acquisition section acquires the satellite image of the ground photographed by the artificial satellite. The provision section then provides, to the user, the point information indicating points at which the number of persons present on the ground is equal to or greater than the predetermined number, which are identified based on the satellite image acquired by the acquisition section. This enables the information processing device to provide information indicating points at which demand is expected to be high by viewing persons present on the ground from a bird's-eye view.

A second aspect of the present disclosure is the first aspect, wherein: the acquisition section acquires first temperature information indicating a ground surface temperature on the ground, from the artificial satellite; and the provision section provides the point information to the specific user identified based on the first temperature information acquired by the acquisition section.

In the second aspect, the acquisition section acquires the first temperature information indicating the ground surface temperature on the ground from the artificial satellite. The provision section then provides the point information to the specific user identified based on the first temperature information acquired by the acquisition section. This enables the information processing device to provide the point information to users carrying out business activity that is suitable for the ground surface temperature by, for example, providing the point information to specific users whose business activity is provision of cold goods in a case in which the ground surface temperature is high, or the like.

A third aspect of the present disclosure is the second aspect, wherein: the acquisition section acquires second temperature information indicating an air temperature on the ground, from a vehicle used by the user; and the provision section provides, to the user, the point information indicating the specific points identified based on the first temperature information and the second temperature information acquired by the acquisition section.

In the third aspect, the acquisition section acquires the second temperature information indicating the air temperature on the ground, from the vehicle used by the user. The provision section then provides, to the user, the point information indicating specific points at which the number of persons present on the ground is equal to or greater than the predetermined number, which are identified based on the first temperature information and the second temperature information acquired by the acquisition section. This enables the information processing device to cause the user to grasp specific points at which the ground surface temperature and the air temperature are suitable for the business activity of the user by, for example, providing point information indicating specific points at which the ground surface temperature and the air temperature are high, to users whose business activity is provision of cold goods, or the like.

A fourth aspect of the present disclosure is any one of the first to third aspects, further including: an identification section that identifies a number of peers, who are other users carrying out business activity that is the same as or similar to a business activity of the user at the points, based on the satellite image acquired by the acquisition section, wherein the provision section provides, to the user, the point information indicating, from among the points, points at which the number of peers identified by the identification section is equal to or less than a second predetermined number.

In the fourth aspect, the identification section identified the number of peers of the user at the points at which the number of persons present on the ground is equal to or greater than a predetermined number, based on the satellite image acquired by the acquisition section. The provision section then provides, to the user, the point information indicating, from among the points, the points at which the number of peers identified by the identification section is equal to or less than a predetermined number. This enables the information processing device to cause the user to grasp points at which a competition rate between the user and peers competing with the user is low and at which the number of persons present on the ground is equal to or greater than a predetermined number.

A fifth aspect of the present disclosure is any one of the first to fourth aspects, further including a generation section that generates a travel route connecting a plurality of the points identified based on the satellite image acquired by the acquisition section, wherein the provision section provides, to the user, the travel route generated by the generation section.

In the fifth aspect, the generation section generates the travel route connecting plural points at which the number of persons present on the ground identified based on the satellite image acquired by the acquisition section is equal to or greater than a predetermined number. The provision section then provides the travel route generated by the generation section, to the user. This enables the information processing device to smoothly cause travel through plural points at which demand is expected to be high, by viewing persons present on the ground from a bird's-eye view.

As described above, the information processing device according to the present disclosure may provide information indicating points at which demand is expected to be high, by viewing persons present on the ground from a bird's-eye view.

BRIEF DESCRIPTION OF THE DRAWINGS

FIG. 2 is a block diagram illustrating a hardware configuration of a server.

DETAILED DESCRIPTION

Explanation follows regarding a provision system 100 according to the present exemplary embodiments. The provision system 100 according to the present exemplary embodiments is a system that provides information indicating points at which demand is expected to be high, by viewing persons present on the ground from a bird's-eye view.

First Exemplary Embodiment

First, a first exemplary embodiment of the provision system 100 according to the present exemplary embodiments will be explained.

Figure 1:
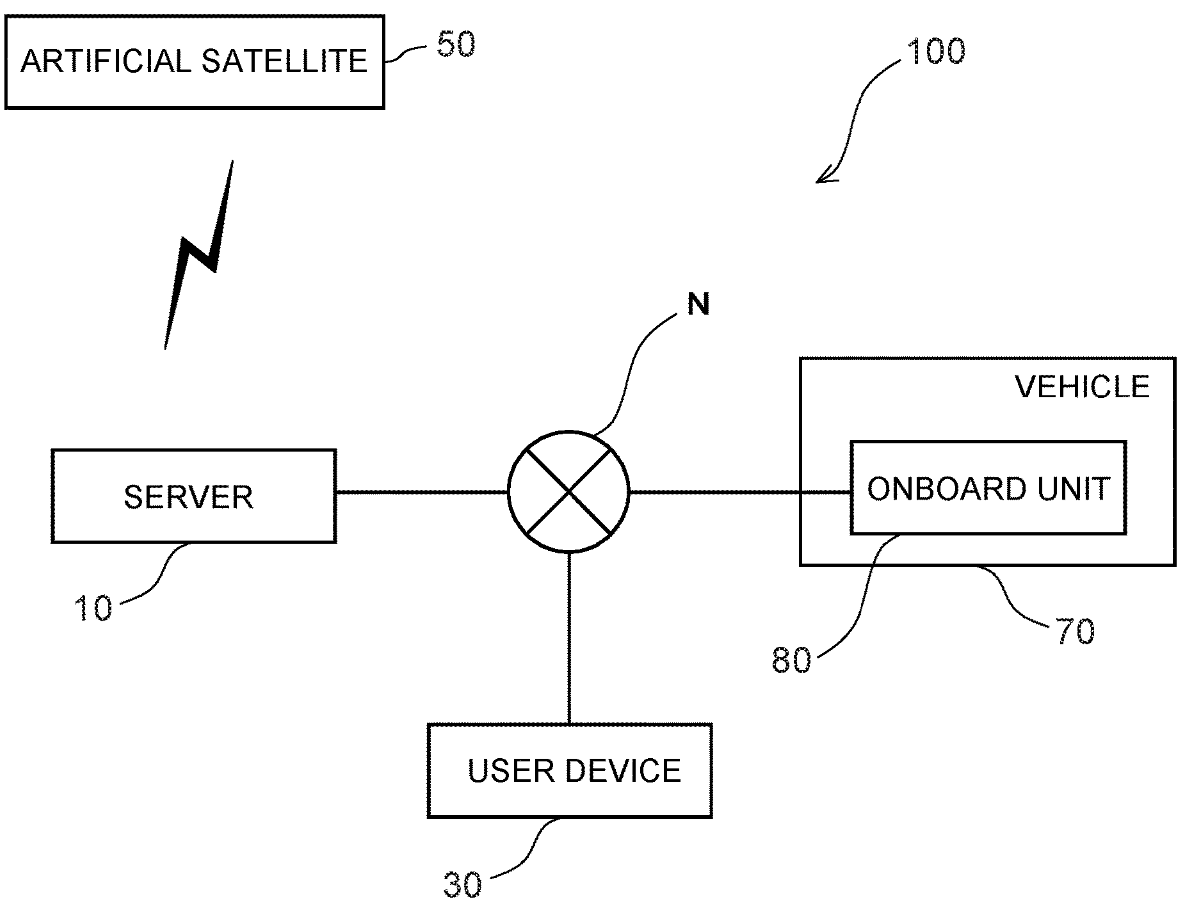
FIG. 1 is a diagram illustrating a schematic configuration of a provision system.

FIG. 1 is a diagram illustrating a schematic configuration of the provision system 100. As illustrated in FIG. 1, the provision system 100 includes a server 10, a user device 30, an artificial satellite 50, and a vehicle 70.

The server 10 is a server computer possessed by a predetermined business operator. The server 10 acquires an image (hereafter also referred to as a "satellite image") photographed by the artificial satellite 50, from the satellite 50. It should be noted that the satellite image may be configured as, for example, an image in which a range of from 0.5 km to 20 km square on the ground is set as a photographing target. This ground includes land, lakes, ponds, the sea, and the like. The server 10 is an example of an "information processing device".

The user device 30 is a computer possessed by a predetermined user. Users include business operators, local governments, and the like. In the first exemplary embodiment, the user is "a business operator that carries out mobile vending using the vehicle 70". Further, the user device 30 may be a general-purpose computer device such as a server computer, a personal computer (PC) or the like, or a portable terminal such as a smartphone, a tablet terminal or the like. In the first exemplary embodiment, the user device 30 is configured as a "smart phone".

The vehicle 70 is a mobile vending vehicle used by the user. Although the vehicle 70 may be any of an engine vehicle, a hybrid vehicle, or an electric vehicle, in the first exemplary embodiment, the vehicle 70 is configured as an engine vehicle as an example. Further, the server 10, the user device 30, and an onboard unit 80 installed at the vehicle 70 are connected via a network N.

Although only one artificial satellite 50 is illustrated in FIG. 1, the artificial satellite 50 is preferably configured by plural artificial satellites capable of photographing the same point on the ground. Further, a number of times that the artificial satellite 50 orbits the earth in one day, an altitude of an orbit of the artificial satellite 50, and the like are arbitrary.

Figure 2:
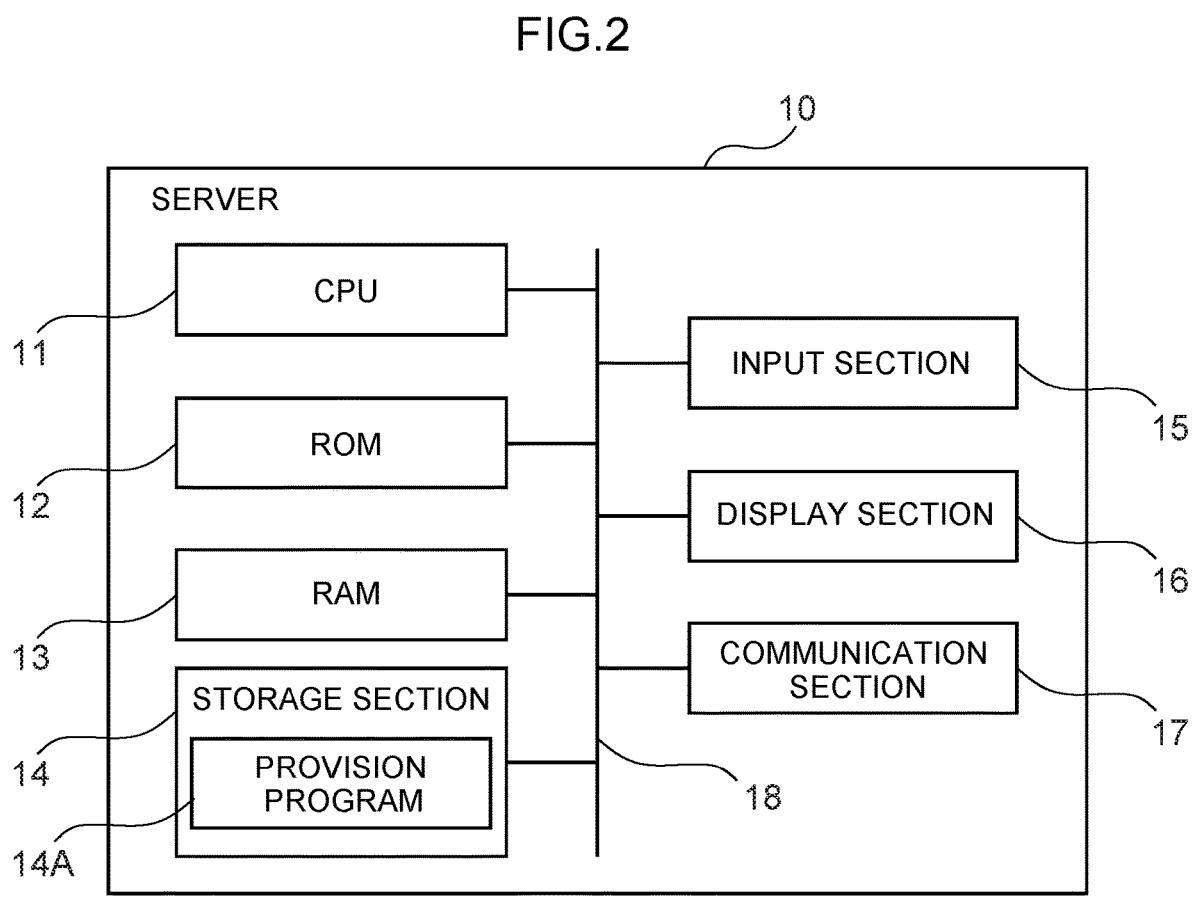

Next, a hardware configuration of the server 10 will be explained. FIG. 2 is a block diagram illustrating the hardware configuration of the server 10.

As illustrated in FIG. 2, the server 10 includes a central processing unit (CPU) 11, a read only memory (ROM) 12, a random access memory (RAM) 13, a storage section 14, an input section 15, a display section 16, and a communication section 17. These configurations are connected so as to be capable of communicating with each other via a bus 18.

The CPU 11 is a central arithmetic processing unit, and the CPU 11 executes various programs and controls various sections. Namely, the CPU 11 reads a program from the ROM 12 or the storage section 14, and executes the program using the RAM 13 as a workspace. The CPU 11 carries out control of the aforementioned respective configurations and various kinds of arithmetic processing according to programs recorded in the ROM 12 or the storage section 14.

The ROM 12 stores various programs and various data. The RAM 13 serves as a workspace to temporarily store programs and data.

The storage section 14 is configured by a storage device such as a hard disk drive (HDD), a solid state drive (SSD), a flash memory or the like, and stores various programs and various data. A provision program 14A for causing the CPU 11 to execute provision processing, which will be described later, is stored in the storage section 14.

The input section 15 includes a pointing device such as a mouse or the like, a keyboard, a microphone, a camera, and the like, and is used to carry out various kinds of input.

The display section 16 is, for example, a liquid crystal display, and displays various information. The display section 16 may employ a touch panel system to function as the input section 15.

The communication section 17 is an interface for communicating with other devices. For example, a wired communication standard such as Ethernet®, FDDI or the like, or a wireless communication standard such as 4G, 5G, Bluetooth®, Wi-Fi® or the like, is used for this communication. The communication section 17 is connected to the network N.

Figure 3:
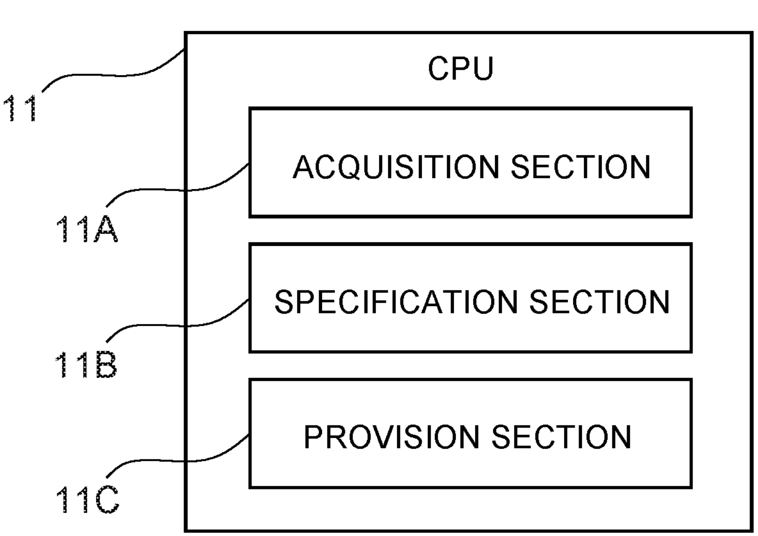
FIG. 3 is a first block diagram illustrating an example of a functional configuration of the server.

Next, a functional configuration of the server 10 will be explained. FIG. 3 is a first block diagram illustrating an example of the functional configuration of the server 10.

As illustrated in FIG. 3, the CPU 11 of the server 10 includes an acquisition section 11A, a specification (identification) section 11B, and a provision section 11C as functional configuration. The respective functional configuration is implemented by the CPU 11 reading and executing the provision program 14A stored in the storage section 14.

The acquisition section 11A acquires a satellite image of the ground photographed by the artificial satellite 50.

The specification section 11B specifies or identifies points (hereafter referred to as "dense points") at which a number of persons present on the ground is equal to or greater than a predetermined number, based on the satellite image acquired by the acquisition section 11A. Each dense point is, for example, a range of from 0.1 km to 0.5 km square on the ground. As an example, the specification section 11B specifies or identifies dense points from the satellite image acquired by the acquisition section 11A using known image recognition technology.

Further, based on the satellite image acquired by the acquisition section 11A, the specification section 11B specifies or identifies a number of peers of the user at the dense points. As an example, in a case in which there has been a transmission request for point information, which will be described later, from the user device 30 of the user with respect to the server 10, the specification section 11B starts specification of the number of peers of the user at the dense points.

The provision system 100 is configured to register users who may acquire point information from the server 10. Each user inputs information such as a business activity, vending hours, main vending locations and the like through the user device 30 to register the information in the provision system 100. The information input by the user is stored in the storage section 14 of the server 10. Further, the provision system 100 provides respective users with identification information, such as a one-dimensional code, a two-dimensional code or the like, for identifying the respective users who have been registered, and requests that the identification information be affixed to roofs of the vehicles 70 used by the respective users.

According to the specifications of the provision system 100 described above, the specification section 11B cross-checks identification information extracted from the satellite image using known image recognition technology and information of the respective users stored in the storage section 14, whereby the business activity of the user corresponding to the identification information may be identified. This enables the specification section 11B to identify the number of peers of the user at the dense points. It should be noted that peers of the user are other users who are carrying out business activity that is the same as or similar to the business activity of the user.

The provision section 11C transmits point information indicating the dense points identified by the specification section 11B to the user device 30. More specifically, the provision section 11C transmits, to the user device 30, point information indicating, from among the dense points, dense points at which the number of peers identified by the specification section 11B is equal to or less than a predetermined number. The point information is information indicating positions of the dense points, and is, for example, global positioning system (GPS) coordinates of the dense points.

Figure 4:
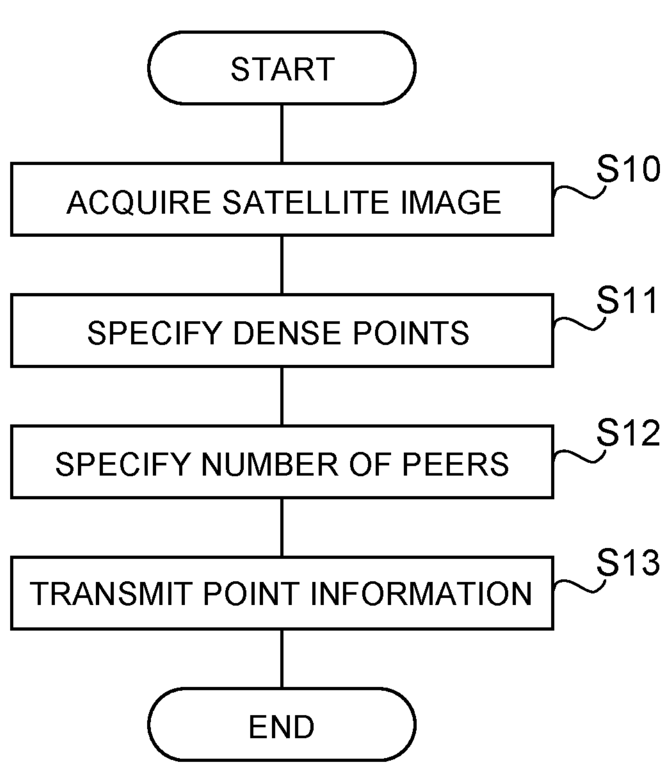
FIG. 4 is a flowchart illustrating a flow of provision processing.

FIG. 4 is a flowchart illustrating a flow of provision processing in which the server 10 provides the point information to the user. The provision processing is carried by the CPU 11 reading the provision program 14A from the storage section 14, and executing the provision program 14A by loading the provision program 14A in the RAM 13.

At step S10 illustrated in FIG. 4, the CPU 11 acquires a satellite image of the ground photographed by the artificial satellite 50. Then, the CPU 11 proceeds to step S11. As an example, the CPU 11 periodically acquires satellite images from the artificial satellite 50.

At step S11, the CPU 11 identifies dense points, based on the satellite image acquired at step S10. Then, the CPU 11 proceeds to step S12.

At step S12, the CPU 11 identifies the number of peers of the user at the dense points, based on the satellite image acquired at step S10. Then, the CPU 11 proceeds to step S13.

At step S13, the CPU 11 transmits, to the user device 30, point information indicating dense points at which the number of peers identified at step S12 is equal to or less than a predetermined number, in order to provide the point information to the user. Then, the CPU 11 ends the provision processing.

As described above, in the server 10 according to the first exemplary embodiment, the CPU 11 acquires the satellite image of the ground photographed by the artificial satellite 50. The CPU 11 then provides, to the user, the point information indicating the dense points identified based on the acquired satellite image. This enables the server 10 to provide information indicating points at which demand is expected to be high by viewing persons present on the ground from a bird's-eye view. Further, the CPU 11 continuously (e.g., once every second) acquires satellite images photographed by the plural artificial satellites 50, and continuously (e.g., once every second) transmits, to the user device 30, point information indicating dense points identified based on the acquired satellite images, whereby the user may grasp points at which demand is expected to be high almost in real time.

Further, in the server 10 according to the first exemplary embodiment, the CPU 11 identifies the number of peers of the user at the dense points, based on the acquired satellite images. The CPU 11 then provides, to the user, point information indicating, from among the dense points, dense points at which the identified number of peers is equal to or less than a predetermined number. This enables the server 10 to cause the user to grasp dense points at which a competition rate between the user and peers competing with the user is low.

Second Exemplary Embodiment

Next, a second exemplary embodiment of the provision system 100 according to the present exemplary embodiments will be explained, while omitting or simplifying portions that overlap with the above exemplary embodiment.

The acquisition section 11A of the second exemplary embodiment acquires first temperature information indicating a ground surface temperature on the ground from the artificial satellite 50, and acquires second temperature information indicating an air temperature on the ground from the vehicle 70 used by the user.

The specification section 11B of the second exemplary embodiment specifies or identifies specific dense points (hereafter referred to as "specific points") and specific users based on the first temperature information and the second temperature information acquired by the acquisition section 11A.

The specification section 11B specifies or identifies, for example, dense points at which the ground surface temperature indicated by the first temperature information is equal to or higher than a first temperature and the air temperature indicated by the second temperature information is equal to or higher than a second temperature, dense points at which the ground surface temperature is less than the first temperature and the air temperature is less than the second temperature, or the like, as the specific points. It should be noted that, in the following, the former specific points are referred to as "first specific points", and the latter specific points are referred to as "second specific points".

The specification section 11B specifies or identifies, for example, users whose business activity is provision of cold goods (e.g., food or beverages), users whose business activity is provision of warm goods, or the like, from among the users registered in the provision system 100, as the specific users. It should be noted that, in the following, the former specific users are referred to as “first specific users”, and the latter specific users are referred to as “second specific users”.

The provision section 11C of the second exemplary embodiment transmits the point information to the user devices 30 of the specific users specified by the specification section 11B. More specifically, the provision section 11C transmits the point information indicating the specific points specified by the specification section 11B to the user devices 30 of the specific users. For example, the provision section 11C transmits point information indicating the first specific points to the user devices 30 of the first specific users, and transmits point information indicating the second specific points to the user devices 30 of the second specific users.

As described above, in the server 10 according to the second exemplary embodiment, the CPU 11 acquires the first temperature information indicating the ground surface temperature on the ground from the artificial satellite 50. The CPU 11 then provides the point information to the specific users identified based on the acquired first temperature information. This enables the server 10 to provide the point information to users carrying out business activity that is suitable for the ground surface temperature by, for example, providing the point information to specific users whose business activity is provision of cold goods in a case in which the ground surface temperature is high, or the like.

Further, in the server 10 according to the second exemplary embodiment, the CPU 11 acquires the second temperature information indicating the air temperature on the ground from the vehicle 70 used by the user. The CPU 11 then provides the user with point information indicating specific dense points (specific points) identified based on the acquired first temperature information and the acquired second temperature information. This enables the server 10 to cause the user to grasp dense points at which the ground surface temperature and the air temperature are suitable for the business activity of the user by, for example, providing point information indicating specific points at which the ground surface temperature and the air temperature are high, to users whose business activity is provision of cold goods, or the like.

Third Exemplary Embodiment

Next, a third exemplary embodiment of the provision system 100 according to the present exemplary embodiments will be explained, while omitting or simplifying portions that overlap with the above exemplary embodiments.

Figure 5:
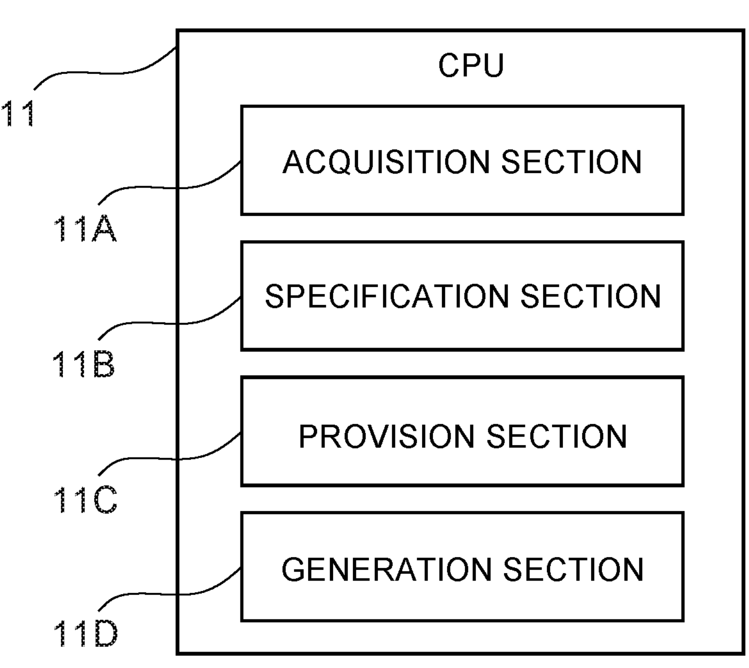
FIG. 5 is a second block diagram illustrating an example of the functional configuration of the server.

FIG. 5 is a second block diagram illustrating an example of a functional configuration of the server 10. It should be noted that explanation will be given while omitting or simplifying portions common to the first block diagram illustrated in FIG. 3.

As illustrated in FIG. 5, the CPU 11 of the server 10 includes the acquisition section 11A, the specification section 11B, the provision section 11C, and a generation section 11D, as functional configuration.

The generation section 11D generates a travel route connecting plural dense points identified based on the satellite image acquired by the acquisition section 11A. For example, in a case in which a dense point A, a dense point B, and a dense point C have been identified as the plural dense points, the generation section 11D generates a travel route that recommends traveling in an order of dense point B to dense point A to dense point C.

The provision section 11C transmits the travel route generated by the generation section 11D to the vehicle 70 to provide the travel route to the user. In the vehicle 70 that has acquired the travel route, the onboard unit 80 sets the travel route in a car navigation device (not illustrated in the drawings) and starts guidance.

As described above, in the server 10 according to the third exemplary embodiment, the CPU 11 generates the travel route connecting the plural dense points identified based on the acquired satellite image. The CPU 11 then provides the generated travel route to the user. This enables the server 10 to smoothly cause travel through plural points at which demand is expected to be high, by viewing persons present on the ground from a bird’s-eye view.

OTHER EMBODIMENTS

In the above exemplary embodiments, the CPU 11 identifies the specific points and the specific users based on the acquired first temperature information and the acquired second temperature information. However, the CPU 11 may acquire one of the first temperature information or the second temperature information, and identify the specific points and the specific users based on one of the acquired first temperature information or the acquired second temperature information.

In the above exemplary embodiments, the CPU 11 may acquire a current position of the vehicle 70 from the onboard unit 80, identify dense points within a predetermined range from the current position of the vehicle 70 based on the acquired current position of the vehicle 70 and the acquired satellite image, and provide the dense points to the user using the vehicle 70.

In the above exemplary embodiments, the CPU 11 may identify a location (e.g., a residential district) at which persons are expected to be present based on the acquired satellite image, and provide the user with a direction indicating the identified location. Consequently, the user who has acquired the direction may make an announcement toward the direction with a speaker installed at the vehicle 70, and may thereby effectively advertise the business activity of the user using the vehicle 70.

It should be noted that the provision processing executed by the CPU 11 reading and executing software (a program) in the above exemplary embodiments may be executed by various types of processors other than a CPU. Such processors include programmable logic devices (PLD) that allow circuit configuration to be modified post-manufacture, such as a field-programmable gate array (FPGA) or the like, and dedicated electric circuits, which are processors including a circuit configuration that has been custom-designed to execute specific processing, such as an application specific integrated circuit (ASIC) or the like. Further, the provision processing may be executed by any one of these various types of processors, or by a combination of two or more of the same type or different types of processors (such as, for example, plural FPGAs, a combination of a CPU and an FPGA, or the like). Furthermore, the hardware structure of these various types of processors is, more specifically, an electric circuit combining circuit elements such as semiconductor elements or the like.

Further, in the above exemplary embodiments, although explanation has been given regarding an aspect in which the provision program 14A is stored (installed) in advance in the storage section 14, there is no limitation thereto. The provision program 14A may be provided in a format recorded on a recording medium such as a compact disc read only memory (CD-ROM), a digital versatile disc read only memory (DVD-ROM), a universal serial bus (USB) memory or the like. Further, the provision program 14A may be provided in a format that is downloadable from an external device via the network N.

What is claimed is:

1. An information processing device comprising:

a memory; and a processor coupled to the memory and configured to:

receive, via a satellite communication, a satellite image of the ground photographed by an artificial satellite;

identify point information indicating a plurality of points at which a number of persons present on the ground is equal to or greater than a first predetermined number, the plurality of points being identified using image recognition technology on the acquired satellite image;

generate a travel route sequentially connecting all of the plurality of points identified based on the acquired satellite image;

transmit, to a user device, the point information and the generated travel route;

acquire first temperature information indicating a ground surface temperature on the ground, from the artificial satellite;

acquire second temperature information indicating an air temperature from a vehicle;

identify, from among the plurality of points, first specific points at which the first temperature information is equal to or higher than a first temperature, and the second temperature information is equal to or higher than a second temperature;

identify, from among the plurality of points, second specific points at which the first temperature information is less than the first temperature, and the second temperature information is less the second temperature;

transmit the point information indicating the first specific points to the user device of a first specific user; and transmit the point information indicating the second specific points to the user device of a second specific user, wherein the first specific user is a user whose business activity is provision of cold goods, and the second specific user is a user whose business activity is provision of warm goods.

2. The information processing device according to claim 1, wherein the processor is configured to:

identify a number of peers, who are other users carrying out business activity that is the same as or similar to a business activity of a user at the points, based on the acquired satellite image; and transmit, to the user device, the point information indicating, from among the points, points at which the identified number of peers is equal to or less than a second predetermined number.

* * * * *